United States Patent
Beregi et al.

[11] 3,856,857
[45] Dec. 24, 1974

[54] AMINO ACIDS AND THEIR DERIVATIVES

[75] Inventors: Laszlo Beregi, Boulogne Sur Seine; Pierre Hugon, Rueil-Malmaison; Jean-Claude Le Douarec, Suresnes, all of France

[73] Assignee: Societe en nom collectif "Science Union et Cie Societe Francaise De Recherche Medicale", Suresnes, France

[22] Filed: June 16, 1972

[21] Appl. No.: 263,572

Related U.S. Application Data

[62] Division of Ser. No. 11,330, Feb. 13, 1970, Pat. No. 3,760,009.

[52] U.S. Cl....... 260/553 E, 260/558 H, 260/558 H, 260/247.5 R, 260/293.78, 260/295 AM, 260/326.1, 260/326.15, 260/326.5 E, 260/471 A, 260/518 R, 260/518 A, 424/248, 424/263, 424/267, 424/274, 424/309, 424/322, 424/324

[51] Int. Cl.......................................... C07c 103/50

[58] Field of Search................... 260/558, 553, 295

[56] References Cited
UNITED STATES PATENTS

| | | | |
|---|---|---|---|
| 2,654,754 | 10/1953 | Bruce et al. | 260/558 |
| 2,700,680 | 1/1955 | Bruce et al. | 260/558 |
| 3,198,834 | 8/1965 | Beregi et al. | 260/570.8 |

*Primary Examiner*—Harry I. Moatz
*Attorney, Agent, or Firm*—Omri M. Behr

[57] ABSTRACT

Amino acids and their derivatives of the formula:

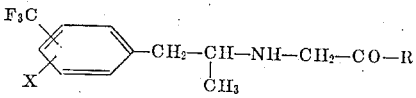

wherein
— X is hydrogen or halogen,
— R is
— hydroxyl
— lower alkyloxy,

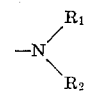

wherein $R_1$ and $R_2$ are hydrogen, lower alkyl, phenyl, pyridyl, halophenyl, halopyridyl, lower aklylphenyl, lower alkylpyridyl, lower alkyloxyphenyl, lower alkyloxypyridyl, trifluoremethylphenyl, trifluoromethylpyridyl; $R_2$ is $CONH_2$ provided that $R_1$ is hydrogen, and $R_1 + R_2$ together with the nitrogen atom to which they are attached are morpholinyl, pyrrolidinyl, piperidyl, indolinyl or isoindolinyl; or

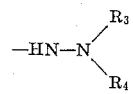

wherein $R_3$ and $R_4$ are hydrogen or lower alkyl.

These compounds possess anorexigenic, analgesic and lipid metabolism regulating properties.

3 Claims, No Drawings

AMINO ACIDS AND THEIR DERIVATIVES

This is a division of application Ser. No. 11,330 filed Feb. 13, 1970, now U.S. Pat. 3,760,009.

SUMMARY OF THE INVENTION

The present invention provides amino acids and their derivatives of the general formula I:

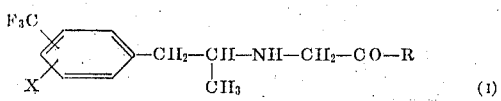
(1)

wherein
— X is selected from the group consisting of a hydrogen atom and a halogen atom such, for example, as a chlorine or a fluorine atom;
— R is selected from the group consisting of:
1. a hydroxyl radical;
2. a lower alkyloxy radical having from 1 to 4 carbon atoms inclusive;
3. a

radical wherein — $R_1$ and — $R_2$ are the same or different and each
is selected from the group consisting of a hydrogen atom, a lower alkyl radical containing from 1 to 4 carbon atoms inclusive, a cyclic radical selected from phenyl and pyridyl radicals, optionally substituted by one or more halogen atoms, lower alkyl or alkyloxy radicals containing from 1 to 4 carbon atoms inclusive, or a trifluoromethyl radical, — $R_2$ is also a —$CONH_2$ radical provided that — $R_1$ represents a hydrogen atom, and — $R_1$ and — $R_2$ may be joined together to form, with the nitrogen atom to which they are attached, a heterocyclic radical selected from the group consisting of a morpholinyl, pyrrolidinyl, piperidyl, indolinyl and isoindolinyl radical;
4. a

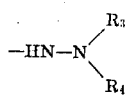

radical wherein $R_3$ and $R_4$ are the same or different and each is selected from the group consisting of a hydrogen atom and a lower alkyl radical containing from 1 to 4 carbon atoms inclusive.

The compounds of the general formula I are new and may be prepared by the following methods which are represented by the reaction schemes:
(A)

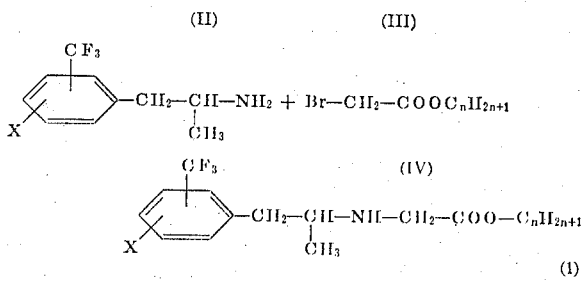

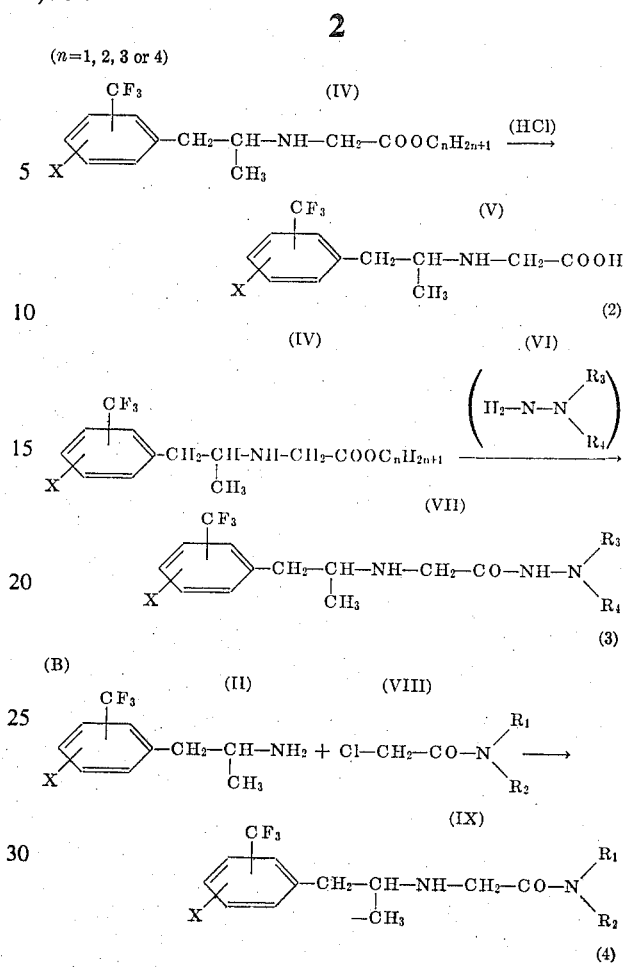

wherein X, $R_1$, $R_2$, $R_3$ and $R_4$ have the meanings given above.

DESCRIPTION OF THE PREFERRED EMBODIMENTS

The compounds of the present invention comprise compounds of general formulae IV, V, VII and IX above.

The alkyl group in compounds of general formula I may be lower alkyl such as methyl, ethyl, propyl, isopropyl, n-butyl, iso-butyl, tert butyl or the like.

In compound of general formula VII the group

$R_3$ and $R_4$ may be hydrogen or lower alkyl such as methyl, ethyl, propyl or butyl and the like and $R_3$ and $R_4$ may be the same or different.

In compounds of general formula IX the group $R_1$ and $R_2$, may be the same or different and may be hydrogen or lower alkyl such as methyl, ethyl, propyl, butyl or the like, where $R_1$ or $R_2$ are substituted phenyl or substituted pyridyl, any carbon atom of the cyclic nucleus may be bonded to the nitrogen atom of the group

similarly the substituents on the cyclic nucleus may be on in any remaining carbon atom thereof. These substituents include lower alkyl, such as methyl, ethyl, propyl, butyl and the like and lower alkoxy such as methoxy, ethoxy, propoxy, butoxy and the like.

The compounds of general formula IV are prepared by heating a solution of the appropriate compound of formula II with 0.5 mole of the appropriate haloacetate of formula III per mole of compound of formula II, in an hydrous solvent. Either the bromo acetate or the chloroacetate may be used, however, a hydrocarbon solvent suitably an aromatic hydrocarbon such as benzene, toluene, xylene or the like are preferred. The mixture is heated under reflux for from about 3 to 6 hours, suitably for about 4 hours, the precipitated salt removed and the product isolated, preferably by fractional distillation.

The compounds of formula V are prepared by saponification of a corresponding compound of formula IV. It is preferred to carry out the saponification in the presence of a strong acid, preferably a mineral acid such as hydrochloric acid. The ester is saponified by heating under reflux with a large excess of acid. There may be used an excess of from about 30 to about 60 moles of acid per mole of ester. The amino acid thus produced is then isolated, (in the form of the acid salt) suitably by filtration, washed with water and dried.

The compounds of general formula VII are prepared by reacting a compound of formula IV with the appropriate hydrazine of general formula VI in a suitable solvent. There may be used from about 1 to about 10 moles of hydrazine, suitably 5 moles of compound per mole of ester of general formula IV. It is preferred to use a reaction inert polar solvent such as a lower alkanol for example, ethanol. It is preferred to carry out the reaction by heating, suitably under reflux for from about ½ to about 3 hours. The product is then isolated. In a suitable procedure the reaction mixture is evaporated to remove the solvent and the residue extracted in a similar, but anhydrous solvent. Since the compounds are most conveniently handled in the form of their salts, there may be added to the solvent an ethereal solution of a suitable acid, ether saturated with gaseous hydrogen chloride being especially preferred.

The compounds of general formula IX are prepared by reacting a compound of general formula II with the appropriate haloacetamide of general formula VIII. The reaction is carried out by adding 0.5 mole of the haloacetamide per mole of compound of formula II. There is utilized a reaction inert solvent, suitably a hydrocarbon solvent preferably an aromatic solvent such as toluene, benzene or xylene.

After addition is complete, the mixture is heated under reflux for from about 8 to about 18 hours suitably for about 10 hours and the product isolated. In the preferred mode of isolation the cooled reaction product is filtered and the filtrate evaporated to remove the solvent. The residue is then isolated, suitably in the form of an acid salt. In one procedure the residue is taken up in an alkanol, such as isopropanol containing the acid, such as methane sulfonic acid, from which the product is isolated as the methane sulfonate in the usual manner.

The invention also includes within its scope the separation of the optical isomers.

The compounds of the general formula I, wherein R represents a hydroxyl radical, may be converted into addition salts with mineral or organic bases such, for example, as alkaline or alkaline earth metals hydroxides and usual amines. The compounds of the general formula I, wherein R has the other abovementioned meanings, may be converted into addition salts with mineral or organic acids such, for example, as hydrochloric, hydrobromic, sulfuric, phosphoric, sulfamic acids as mineral acids, and acetic, propionic, maleic, fumaric, tartaric, citric, oxalic, methane sulfonic, benzoic, anthranilic acids as organic acids. All these salts are also included in the present invention.

The new compounds of the present invention and their physiologically tolerable addition salts possess valuable pharmacological and therapeutic properties. They may be used in particular as anorexigenic, analgesic and lipid metabolism regulator.

Their toxicity is weak and the $LD_{50}$ in mice varies from 125 to 300 mg/kg by the intraperitoneal route and from 375 to 750 mg/kg by the oral route.

The anorexigenic activity was studied in the rat and in the dog. It was observed that the food intake of the rat was reduced by 21 to 100% 2 hours after administering the products at the dose of 2.5 to 20 mg/kg P.O. The food intake of the dog was reduced by 50% with the dose of 5 to 10 mg/kg in the same conditions.

The analgesic activity was demonstrated by the Haffner method [DMW 55, 731, (1929)]. The active does was found to be in the range of from 12.5 to 40 mg/kg I.P. for the different compounds of the invention.

An activity of these compounds on lipid metabolism was also observed. It was found that doses of 10 to 15 mg/kg administered by the oral route induced in the rate an increase of 40 to 50% of the plasmatic free fatty acids (F.F.A). Administered for 10 days to the rat at doses of 10 to 30 mg/kg P.O., it was noted a reduction of 25 to 50% of the epididymal fat in comparison with the untreated animals.

The here-above described properties, as well as the low toxicity, allow the use of the new compounds of the invention in therapy, especially in the treatment of obesity and pain.

The present invention also provides pharmaceutical compositions comprising a compound of the general formula I or a physiologically tolerable salt thereof in admixture or conjunction with a suitable pharmaceutical carrier such, for example, as distilled water, glucose, lactose, talc, starch, magnesium stearate, cocoa butter etc. . . .

These pharmaceutical compositions may be administered by the oral, rectal or parenteral route at doses of 10 to 200 mg, 1 to 5 times a day.

The following Examples illustrate the invention, the parts being by weight and the melting points being determined on a Kofler bank unless otherwise stated.

EXAMPLE 1

Ethyl [1-(3-trifluoromethyl phenyl) prop-2-yl]-amino acetate:

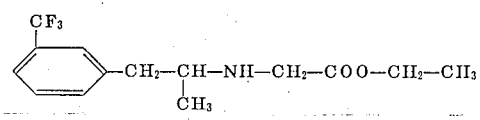

Twenty-five parts of ethyl bromo acetate were added to a solution of 61 parts of 1-(3-trifluoromethyl phenyl)-2-amino propane in 120 parts of anhydrous benzene. The mixture was refluxed for 4 hours. After being allowed to cool at room temperature, the salt was filtered off. The distillation of the residual liquid yielded 31 parts of ethyl [1-(3-trifluoromethyl phenyl) prop-2-yl]-amino acetate, B.P./0.3 mm Hg : 102°–104° C. The corresponding hydrochloride, recrystallized in ethyl acetate, melted at 203° C.

EXAMPLES 2-5

The following compounds were prepared according to the method described in Example 1:
2. Ethyl [1-(2-trifluoromethyl phenyl) prop-2-yl]-amino acetate, B.P./0.25mm Hg : 97°–100° C, starting from ethyl bromo acetate and 1-(2-trifluoromethyl phenyl)-2 amino propane.
3. Ethyl [1-(3-trifluoromethyl-4-chloro phenyl) prop-2-yl]-amino acetate, B.P./0.35 mm Hg : 124°–126° C. M.P. (hydrochloride) : 168° C (isopropanol), starting from ethyl bromo acetate and 1-(3-trifluoromethyl-4-chloro phenyl)-2 amino propane.
4. Methyl [1-(3-trifluoromethyl phenyl) prop-2-yl]-amino acetate, M.P. (hydrochloride) 215°–218° C (isopropanol), starting from methyl bromo acetate and 1-(3-trifluoromethyl phenyl)-2 amino propane.
5. Propyl [1-(3-trifluoromethyl phenyl) prop-2-yl]-amino acetate, M.P. (hydrochloride) 198° C (isopropanol), starting from propyl bromo acetate and 1-(3-trifluoromethyl phenyl)-2 amino propane.

EXAMPLE 6

N-[1-(3-trifluoromethyl phenyl) prop-2-yl] glycine:

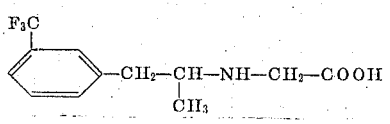

A mixture of 20 parts of ethyl [1-(3-trifluoromethyl phenyl) prop-2-yl]-amino acetate hydrochloride and 300 parts of concentrated hydrochloric acid (d:1.19) was refluxed for 3 hours. The crude product was collected by filtration, washed with 100 parts of water and dried. There were obtained 16 parts of N-[1-(3-trifluoromethyl phenyl) prop-2-yl] glycine hydrochloride, M.P. 200°C with decomposition.

EXAMPLES 7 - 8

The following compounds were prepared according to the method described in Example 6.
7. N-[1-(2-trifluoromethyl phenyl) prop-2-yl] glycine, M.P. (hydrochloride) 203°–205°C with decomposition (water), starting from ethyl [1-(2-trifluoromethyl phenyl) prop-2-yl]-amino acetate hydrochloride and hydrochloric acid.
8. N-[1-(3-trifluoromethyl-4-chloro phenyl) prop-2-yl] glycine, M.P. (hydrochloride) 207°–208°C. (diluted hydrochloric acid), starting from ethyl [1-(3-trifluoromethyl-4-chloro phenyl) prop-2-yl]-amino acetate hydrochloride and hydrochloric acid.

EXAMPLE 9

N-methyl[1-(3-trifluoromethyl phenyl) prop-2-yl]-amino acetamide:

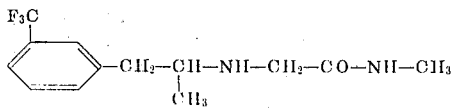

To a solution of 40.6 parts of 1-(3-trifluoromethyl phenyl)-2-amino propane in 150 parts of anhydrous benzene there were added 10.8 parts of N-methyl chloro acetamide. The addition required ten minutes and the reaction mixture was then refluxed for 10 hours.

The hydrochloride of the starting amine which separated was collected by filtration, the solvent was evaporated and the residue taken up by a mixture of 100 parts of isopropanol and 8.75 parts of methane sulphonic acid. The solid which separated was collected by filtration. It was crystallized from 300 parts of isopropanol to give 21 parts of N-methyl [1-(3-trifluoromethyl phenyl) prop-2-yl]-amino acetamide methane sulphonate.

EXAMPLES 10 - 22

The following compounds were prepared according to the method described in Example 9:
10. N-methyl [1-(3-trifluoromethyl-4-chloro phenyl) prop-2-yl]-amino acetamide, M.P. (hydrochloride) 175°–176°C. (acetone), starting from 1-(3-trifluoromethyl-4-chloro phenyl)-2-amino propane and N-methyl chloro acetamide.
11. N, N-dimethyl [1-(3-trifluoromethyl phenyl) prop-2-yl]-amino acetamide, M.P. (hydrochloride) 224°–226°C. (isopropanol), starting from 1-(3-trifluoromethyl phenyl)-2-amino propane and N, N-dimethyl chloro acetamide.
12. [1-(3-trifluoromethyl phenyl) prop-2-yl]-amino acetamide, M.P. 74°–75°C. (cyclohexane) starting from 1-(3-trifluoromethyl phenyl)-2-amino propane and chloro acetamide.
13. 1-{[1-(3-trifluoromethyl phenyl) prop-2-yl]-amino acetyl}indoline, M.P. (hydrochloride) 260°C (methanol), starting from 1-(3-trifluoromethyl phenyl-2-amino propane and 1-(chloro acetyl) indoline.
14. N-pyrid-2-yl-[1-(3-trifluoromethyl phenyl) prop-2-yl]-amino acetamide, M.P. (hydrochloride) 230°–232°C (water), starting from 1-(3-trifluoromethyl phenyl)-2-amino propane and N-pyrid-2-yl chloro acetamide.
15. N-carbamoyl [1-(3-trifluoromethyl phenyl) prop-2-yl]-amino acetamide, M.P. 116°–117°C. (ethanol-water), starting from 1-(3-trifluoromethyl phenyl)-2-amino propane and chloroacetyl urea.
16. N-(4-chloro phenyl) [1-(2-fluoro-4-trifluoromethyl phenyl) prop-2-yl]-amino acetamide, starting from 1-(2-fluoro-4-trifluoromethyl phenyl)-2-amino propane and N-(4-chloro phenyl)-chloro acetamide.
17. N-(3-methoxy phenyl) [1-(3-chloro-4-trifluoromethyl phenyl) prop-2-yl]-amino acetamide, starting from 1-(3-chloro-4-trifluoromethyl phenyl)-2-amino propane and N-(3-methoxy phenyl) chloro acetamide.
18. N-(4-methyl pyrid-2-yl) [1-(2-trifluoromethyl phenyl) prop-2-yl]-amino acetamide, starting from 1-(2-trifluoromethyl phenyl)-2-amino propane and N-(4-methyl pyrid-2-yl)-chloro acetamide.
19. 1-{[1-(3-trifluoromethyl phenyl) prop-2-yl]-amino acetyl} piperidine, M.P. (hydrochloride) 218°–219°C. (isopropanol) starting from 1-(3-trifluoromethyl phenyl)-2-amino propane and N-chloro acetyl piperidine.
20. N-(3-trifluoromethyl phenyl) [1-(3-trifluoromethyl phenyl) prop-2-yl]-amino acetamide, M.P. (methane sulphonate) 220°C. (ethanol), starting from 1-(3- trifluoromethylphenyl)-2-amino propane and N-(3-trifluoromethyl phenyl)-chloro acetamide.

21. 4-{[(3-trifluoromethyl-4-fluoro phenyl) prop-2-yl]-amino acetyl} morpholine, starting from 1-(3-trifluoromethyl-4-fluoro phenyl)-2-amino propane and N-chloroacetyl morpholine.

22. 1-{[1-(2-chloro-4-trifluoromethyl phenyl) prop-2-yl]-amino acetyl} pyrrolidine, starting from 1-(2-chloro-4-trifluoromethyl phenyl)-2-amino propane and N-chloroacetyl pyrrolidine.

EXAMPLE 23

[1-(3-trifluoromethyl phenyl) prop-2-yl]-amino acetyl hydrazine:

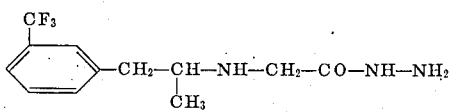

To 25 parts of hydrazine hydrate (98%) in 250 parts of ethanol there were added, during ten minutes, 29 parts of ethyl [1-(3-trifluoromethyl phenyl) prop-2-yl]-amino acetate. The mixture was refluxed for 1 hour. After evaporation of the solvent, the residue was taken up by 200 parts of anhydrous ethanol and an excess of hydrochloric ether. The salt separated in a well crystallized form was dried; 30 parts of [1-(3-trifluoromethyl phenyl) prop-2-yl]-amino acetyl hydrazine dihydrochloride, M.P. 172°–173°C (Micro Kofler) were obtained.

EXAMPLE 24

The following example was prepared according to the method described in Example 23:

N-methyl-N'- [1-(3-fluoro-4-trifluoromethyl phenyl) prop-2-yl]-amino acetyl hydrazine, starting from ethyl [1-(3-fluoro-4-trifluoromethyl phenyl) prop-2-yl]-amino acetate and N-methyl hydrazine.

We claim:

1. N-Methyl[1-(3-trifluoromethyl-4-chlorophenyl) prop-2-yl]-amino acetamide.

2. N-Carbamoyl[1-(3-trifluoromethyl phenyl) prop-2-yl]-amino acetamide.

3. [1-(3-Trifluoromethyl phenyl) prop-2-yl]-amino acetyl hydrazine.

* * * * *